United States Patent
Patanelli et al.

[15] 3,670,079

[45] June 13, 1972

[54] ANABOLIC AGENTS

[72] Inventors: Dolores J. Patanelli, Rahway; Glen E. Arth, Cranford, both of N.J.

[73] Assignee: Merck & Co., Inc., Rahway, N.Y.

[22] Filed: Oct. 6, 1970

[21] Appl. No.: 78,636

[52] U.S. Cl. .................................................. 424/241, 99/2
[51] Int. Cl. ...................................................... A61k 27/00
[58] Field of Search ............................ 424/241; 260/239.55

[56] References Cited

UNITED STATES PATENTS 3,254,074  5/1966  Arth et al .......................... 260/239.55

*Primary Examiner*—Richard L. Huff
*Attorney*—I. Louis Wolk, J. Jerome Behan and Hesna J. Pfeiffer

[57] ABSTRACT

The present invention relates to the use of certain steroid compounds as anabolic agents.

3 Claims, No Drawings

ANABOLIC AGENTS

SUMMARY OF THE INVENTION

The present invention relates to the use of certain steroid compounds as anabolic agents. In particular, this invention relates to the use of 19-nor-18-H or methyl-spiroxenones, I, or the 3-ζ-ol-ethers, II, thereof having the following formulas:

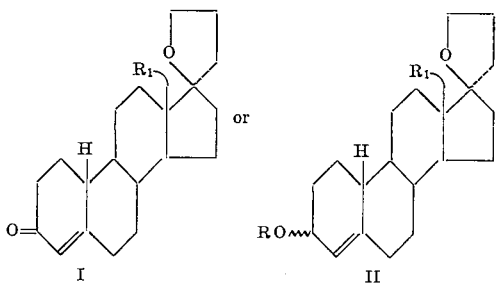

wherein $R_1$ is $CH_3$ or H, and R is alkyl, cycloalkyl, substituted alkyl, or heterocycloalkyl, and preferably is loweralkyl having one to eight carbon atoms.

An anabolic agent is one which stimulates the synthesis of cellular protein and the retention of nitrogen. Generally speaking, in the steroid art, androgenic hormones possess to varying degrees this physiological effect. Testosterone, for instance, has marked anabolic properties. A substance of comparable potency could be useful for treatment of persons debilitated by various metabolic and endocrine disorders; however, in connection with high androgenic activity, many such compounds cannot be used without undesirable side-effects. Research effort has for many years been devoted to the synthesis or discovery of a substance which has a favorable anabolic/androgenic ratio. Obviously, if the androgenic activity is low and anabolic activity high, the ratio will be high.

It has now been found that certain steroid compounds, having the structures given above, possess anabolic activity and lack potent androgenic side-effects.

The advantages of such activity are many. For instance, anabolic agents can be used in the treatment of domestic animals, fowl, and fish to increase the retention of protein without increasing the food intake of the subject. The net effect is an increased food efficiency. Anabolic agents can also be used in the treatment of humans debilitated as a result of surgery or illness or by chronic inability to retain nitrogen. In addition, they can be used as agents to counteract the catabolic effect of adrenal cortical hormones.

It is, therefore, an object of this invention to provide a new use for 19-nor-20-spirox-4-en-3-one and the 3-ethers of 3-dihydro-19-nor-20-spirox-4-en-3-one. It is a further object to provide these steroids as anabolic agents, having a high anabolic/androgenic ratio. It is a still further object of this invention to provide a method of increasing the body and protein weights of subjects, both animal and human, by providing these subjects with 19-nor-20-spirox-4-en-3-one compounds as anabolic agents. Further objects will become apparent upon a further reading of this application.

The compounds useful as anabolic agents have the following structures:

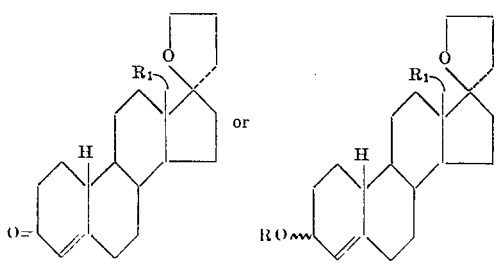

when $R_1$ is $CH_3$ or H, and R is alkyl, cycloalkyl, substituted alkyl or heterocycloalkyl, preferably loweralkyl having 1-8 carbon atoms. The compounds can be generally described as 19-nor-20-spirox-4-en-3-one and the 3-ethers of the 3-dihydro-19-nor-20-spirox-4-en-3-ones. These compounds as novel compounds do not form a part of this invention. Generally, the compounds are described in U.S. Pat. No. 3,254,074, issued to Merck & Co., Inc. The use disclosed in that patent for the compounds is as an aldosterone inhibitor. The 3-ethers of the 3-dihydro-19-nor compound are disclosed in a copending application, U.S. Ser. No. 818,447, filed Apr. 22, 1969. The compounds are described in the patent as having oral estrogenic antagonist activity with low progestational side effects. The 3-ethers are prepared from the 3-keto compound by reducing to the 3-hydroxy form and then reacting the latter compound with an alkyl-, cycloalkyl-, substituted alkyl-, or hetero-cycloalkyl-halide or sulfate. The preferred substituent, as disclosed above, is an alkyl group having one to eight carbon atoms. The alkyl moiety can be branched or straight chain, saturated or unsaturated. Examples of suitable alkyl groups are methyl, ethyl, propyl, butyl, pentyl, heptyl, and the like. The substituted alkyl ethers include di(alkyl)aminoalkyl, suitably di(loweralkyl)aminoloweralkyl, and preferably, di(lower-alkyl)aminoethyl wherein loweralkyl is one to eight carbon atoms. By the term "cycloalkyl" is meant alkyl having three to eight carbon atoms, including cyclopropyl, cyclopentyl, cyclohexyl, and the like. Heterocycloalkyl is used to mean a 5 or 6 membered ring having 1-2 hetero atoms, each being O, N, or S, such as furyl, pyranyl, and the like.

The compounds can be administered orally, subcutaneously, or parenterally. The preferred mode of administration is by parenteral injection. They can be compounded in the form of pharmaceutically acceptable non-toxic solutions, suspensions, tablets, capsules, and the like. As carriers, there can be used substances which do not react with the active substances and which are either pharmacologically inert or are effective as adjuvants, such as for example, water, gelatine, lactose, starch, colloidal silicic acid, magnesium stearate, talc, vegetable oils, benzyl alcohols, gums, polyalkylene glycols, or other known carriers. The pharmaceutical preparations can be sterilized, or can contain auxiliary substances, such as preserving agents, stabilizing agents, wetting agents, emulsifying agents, or buffers. They may also contain other therapeutically valuable substances. The percentage of the active compound in the composition may be varied. In compositions to be administered orally, the dosage level is such so that each capsule or tablet contains 1–50 mg. of compound. This dosage level permits a dosage rate of 25 mg. to 100 mg. per kilogram per day. This level is for human consumption.

The anabolic activity of the compounds of this invention can also be utilized with success on animals as well as humans. The advantage of the compounds of this invention is the lack of estrogenic activity as compared with anabolic compounds used in the veterinary field. The daily dosage rate for animals, such as sheep, pigs, or cattle can be from 25–250 mg./kg. per day on an oral basis.

These compounds can also be administered by injection to domestic animals, using pharmaceutically acceptable carriers, etc. An alternative method of administration is by subcutaneous implantation. The compound can be encapsulated or enclosed in a semipermeable container, and placed under the skin of the animal by surgery of injection. The amount of drug in a long-lasting type of injection can be adjusted to give the desired daily dosage over a period of time.

Dosage rates below or above these ranges can also be used; the most favorable dosage range being conditioned upon the purpose for which it is administered and the response thereto.

The anabolic activity of the compounds of this invention can be determined in the following manner.

In castrated 21 day old male rats, 19-nor-20-spirox-4-en-3-one is administered daily for seven days by subcutaneous route. After autopsy, the following results are obtained:

TABLE 1

| Compound | S.C. dose/day | Body Wt. Increase + or − (g.) | Levator ani (mg.) | Seminal vesicle (mg.) | Ventral Prostate (mg.) |
| --- | --- | --- | --- | --- | --- |
| Control | 0 | +44 | 24 | 10 | 9 |
| Testosterone | 10 mg. | +45 | 34 | 21 | 25 |
| 19-nor-20-spirox-4-en-3-one | 1000 mg. | +52 | 45 | 12 | 13 |

As can be seen, the rats administered the test compound 19-nor-20-spirox-4-en-3-one showed increase in body weight and levator ani, with only slight increases in weights of the seminal vesicle and ventral prostate. When testosterone is administered in 1/100 the dosage, body weight and levator ani show increases over the unmedicated controls, but the seminal vesicle and ventral prostate are greatly enlarged, showing the significant androgenic activity of testosterone.

In a repeat of the above assay, the following was obtained:

TABLE 2

| Compound | S.C. dose/day | Body Wt. Increase + or − (g.) | Levator ani (mg.) | Seminal Vesicle (mg.) | Ventral Prostate (mg.) |
| --- | --- | --- | --- | --- | --- |
| Control | 0 | +38 | 25 | 10 | 12 |
| Testosterone | 10 μg. | +38 | 26 | 17 | 23 |
|  | 30 μg. | +42 | 35 | 28 | 30 |
| 19-nor-20-spirox-4-en-3-one | 0.5 mg. | +38 | 29 | 10 | 13 |
|  | 2.0 mg. | +44 | 45 | 11 | 14 |
|  | 4.0 mg. | +44 | 47 | 13 | 15 |

In the above tables, the dosage given each animal per day is by the subcutaneous route. The amount of testosterone used is less than that of the test compound, in order to provide a correlation between increase in body weight and increase in androgenicity. Androgenicity is measured by the increases in weights of the seminal vesicle and the ventral prostate. The levator ani is a muscle of the perineal complex of the rat which is known to increase in size in response to androgen therapy.

The comparison of the levator ani and body weights, against the seminal vesicle and ventral prostate weights, give a qualitative measure of the anabolic/androgenic ratio. It can be seen that the compound, 19-nor-20-spirox-4-en-3-one, gives increases in the "anabolic" tests without concomitant increases in the "androgenic" tests.

What is claimed is:

1. A process for the promotion of storage of protein and for causing an increase in growth of warm-blooded animals which consists of administering to the animal in which weight gain is desired a composition comprising 19-nor-20-spirox-4-en-3-one or 3-loweralkyl or cycloalkyl ethers of 3-dihydro-19-nor-20-spirox-4-en-3-one in the amount of from 25 mg. per kg. of body weight per day to about 250 mg. per kg. of body weight per day.

2. A method of stimulating meat-source animal growth which comprises orally administering to an animal in which weight gain is desired, a member of the group consisting of 19-nor-20-spirox-4-en-3-one and 3-loweralkyl or cycloalkyl ethers of 3-dihydro-19-nor-20-spirox-4-en-3-one in a quantity sufficient to provide an amount of about 25 to about 250 mg. daily per kilogram of animal weight.

3. A method of stimulating meat-source animal growth which comprises injecting the animal in which weight gain is desired with an effective amount of 19-nor-20-spirox-4-en-3-one or the 3-loweralkyl or cycloalkyl ethers of 3-dihydro-19-nor-20-spirox-4-en-3-one, the effective amount being such that from 25 to 250 mg. per kilogram of body weight are administered daily.

* * * * *

UNITED STATES PATENT OFFICE
CERTIFICATE OF CORRECTION

Patent No. 3,670,079   Dated June 13, 1972

Inventor(s) Dolores J. Patanelli & Glen E. Arth

It is certified that error appears in the above-identified patent and that said Letters Patent are hereby corrected as shown below:

In the title page of the patent, the Assignee should read -- MERCK & CO., Inc., Rahway, N. J. --.

Signed and sealed this 26th day of September 1972.

(SEAL)
Attest:

EDWARD M. FLETCHER, JR.
Attesting Officer

ROBERT GOTTSCHALK
Commissioner of Patents